(12) United States Patent
Warman (10) Patent No.: US 12,298,844 B2
(45) Date of Patent: May 13, 2025

(54) CHANNELIZED FORWARD ERROR CORRECTION

(71) Applicant: Raytheon Applied Signal Technology, Inc., San Jose, CA (US)

(72) Inventor: Lawrence K Warman, Lothian, MD (US)

(73) Assignee: Raytheon Applied Signal Technology, Inc., San Jose, CA (US)

( * ) Notice: Subject to any disclaimer, the term of this patent is extended or adjusted under 35 U.S.C. 154(b) by 0 days.

(21) Appl. No.: 18/231,557

(22) Filed: Aug. 8, 2023

(65) Prior Publication Data

US 2025/0053476 A1    Feb. 13, 2025

(51) Int. Cl.
    *G06F 11/10*    (2006.01)
(52) U.S. Cl.
    CPC .................... *G06F 11/10* (2013.01)
(58) Field of Classification Search
    CPC ....................................................... G06F 11/10
    See application file for complete search history.

(56) References Cited

U.S. PATENT DOCUMENTS

| | | | | |
|---|---|---|---|---|
| 2003/0066011 A1* | 4/2003 | Oren | ................... | H03M 13/093 |
| 2012/0230448 A1* | 9/2012 | Kang | ................... | H04L 1/0071 375/295 |
| 2012/0254689 A1* | 10/2012 | Resch | ................... | H04L 9/0891 714/763 |
| 2018/0167165 A1* | 6/2018 | Kons | ................... | H04L 1/0045 |
| 2022/0052712 A1* | 2/2022 | Pan | ................... | H03M 13/2942 |
| 2023/0113300 A1* | 4/2023 | Li | ................... | H04L 1/1893 714/726 |

OTHER PUBLICATIONS

M. Qiu and J. Yuan, "Sub-Block Rearranged Staircase Codes for Optical Transport Networks," 2022 IEEE International Symposium on Information Theory (ISIT), Espoo, Finland, 2022, pp. 2124-2129 (Year: 2022).*
A. Arafa and R. D. Wesel, "Timely Transmissions Using Optimized Variable Length Coding," IEEE INFOCOM 2021—IEEE Conference on Computer Communications Workshops (INFOCOM WKSHPS), Vancouver, BC, Canada, 2021, pp. 1-6. (Year: 2021).*
M. Chen et al., "Improved BER performance of real-time DDO-OFDM systems using interleaved Reed-Solomon codes," IEEE Photon. TechNo. Lett., vol. 28, No. 9, pp. 1014-1017, May 2016.

(Continued)

*Primary Examiner* — Albert Decady
*Assistant Examiner* — Enamul M Kabir
(74) *Attorney, Agent, or Firm* — Schwegman Lundberg & Woessner, P.A.

(57) ABSTRACT

According to at least one aspect of the present disclosure, a system for encoding and correcting data is provided, the system comprising at least one controller configured to: receive a datablock; channelize the datablock into a plurality of subblocks of varying bit-widths; determine one or more error codes for each subblock of the plurality of subblocks; append at least one of the one or more error codes to each subblock of the plurality of subblocks; and combine the plurality of subblocks into a modified datablock.

5 Claims, 5 Drawing Sheets

(56) References Cited

OTHER PUBLICATIONS

Venkateswara R. et al., "Performance Evolution of OFDM System: With and Without Reed-Solomon Codes," IEEE 2022 4th International Conference on Advances in Computing, Communication Control and Networking (ICAC3N), pp. 1827-1831.

Nyirongo N, Malik WQ, Edwards DJ. "Concatenated RS Convolutional Codes for Ultrawideband Multiband-OFDM", IEEE International Conference on Ultra-wideband 2006, 137-142.

Jiang Z. "Performance Analysis of Utilizing Reed Solomon Code in Redundant Array of Independent Disks", IEEE, 2022 International Symposium on Advances in Informatics, Electronics and Education (ISAIEE), pp. 69-72.

* cited by examiner

CHANNELIZED FORWARD ERROR CORRECTION

FEDERALLY SPONSORED RESEARCH

This invention was made with government support under the Department of Defense. The U.S. government has certain rights in the invention.

BACKGROUND

Telecommunication systems can transmit data over various wired and wireless connections. However, due to the nature of data transmission through telecommunication systems, errors may arise in the data between the origin and destination. Error correction techniques seek to correct errors that arise during transmission. Forward error correction techniques, a subclass of error correction techniques, attempt to correct errors at the destination when the data is received.

SUMMARY

According to at least one aspect of the present disclosure, a system for encoding and correcting data is provided, the system comprising at least one controller configured to: receive a datablock; channelize the datablock into a plurality of subblocks of varying bit-widths; determine one or more error codes for each subblock of the plurality of subblocks; append at least one of the one or more error codes to each subblock of the plurality of subblocks; and combine the plurality of subblocks into a modified datablock.

In some examples, the system further comprises an output configured to transmit the modified datablock to one or more devices. In some examples, an error occurring to data on a given row of the modified datablock will be present on a corresponding row of at least one subblock of the plurality of subblocks. In some examples, the at least one controller is configured to: generate a first modified subblock based on the first subblock having the first width, and generate a second modified subblock based on the second subblock having the second width, wherein a number of rows of the first modified subblock equals a number of rows of the second modified subblock. In some examples, the system further comprises a receiver configured to receive data from one or more devices. In some examples, the controller is further configured to: receive a second modified datablock; channelize the second modified datablock into a plurality of second subblocks of varying bit-widths; correct one or more errors contained in the plurality of second subblocks using one or more error codes appended to each second subblock of the plurality of second subblocks; responsive to correcting the one or more errors, removing the one or more error codes appended to each second subblock of the plurality of subblocks; and responsive to removing the one or more error codes, combining the subblocks into a second datablock. In some examples, the controller is further configured to: increase the number of rows of a given second subblock by a number of new rows based on a respective bit-width of the given second subblock; populate the new rows with a predetermined sequence of values; and responsive to populating the new rows with the predetermined sequence of values, correct the one or more errors contained in the plurality of second subblocks using the one or more error codes. In some examples, the controller is further configured to: increase a number of rows of a given subblock by a number of new rows based on a respective bit-width of the given subblock; populate the new rows with a predetermined sequence of values; and responsive to populating the new rows with the predetermined sequence of values, determine the one or more error codes for each subblock of the plurality of subblocks based at least in part on the predetermined sequence of values. In some examples, determining the one or more respective error codes includes using, for each subblock, an encoding rate based on a narrowest subblock of the plurality of subblocks.

According to at least one aspect of the present disclosure, a method for encoding and correcting data is provided, the method comprising: receiving a datablock; channelize the datablock into a plurality of subblocks of varying bit-widths; determine one or more error codes for each subblock of the plurality of subblocks; append at least one of the one or more error codes to each subblock of the plurality of subblocks; and combine the plurality of subblocks into a modified datablock.

In some examples, the method further comprises receiving a second modified datablock; channelizing the second modified datablock into a plurality of second subblocks of varying bit-widths such that, if an error occurred on a given row of the second modified datablock, the error will be present on a corresponding row of at least one second subblock of the plurality of subblocks; correcting one or more errors contained in the plurality of second subblocks using one or more error codes appended to each second subblock of the plurality of second subblocks; responsive to correcting the one or more errors, removing the one or more error codes appended to each second subblock of the plurality of subblocks; and responsive to removing the one or more error codes, combining the plurality of second subblocks into a second datablock. In some examples, the method further comprises increasing a number of rows of a given second subblock by a number of new rows based on a respective bit-width of the given second subblock; populating a portion of the new rows with a predetermined sequence of values; and responsive to populating the portion of the new rows with a predetermined sequence of values, correcting the one or more errors contained in the plurality of second subblocks using the one or more error codes. In some examples, the method further comprises increasing a number of rows of a given subblock by a number of new rows based on a respective bit-width of the given subblock; populating a portion of the new rows with a predetermined sequence of values; and responsive to populating the portion of the new rows with the predetermined sequence of values, determining the one or more error codes for each subblock of the plurality of subblocks based at least in part on the predetermined sequence of values. In some examples, the method further comprises responsive to appending at least one error code of the one or more error codes to each subblock, modifying the number of rows in each subblock such that each subblock has the same number of rows. In some examples, determining the one or more respective error codes includes using, for each subblock, an encoding rate based on a narrowest subblock of the plurality of subblocks.

According to at least one aspect of the present disclosure, a non-transitory computer-readable medium containing thereon instructions for encoding and correcting data is provided, the instructions instructing at least one processor to: determine whether a datablock has been received; responsive to determining that the datablock has been received, channelize the datablock into a plurality of subblocks of varying bit-widths; determine one or more error codes for each subblock of the plurality of subblocks;

append at least one of the one or more error codes to each subblock of the plurality of subblocks; and combine the plurality of subblocks into a modified datablock.

In some examples, the instructions further instruct the at least one processor to: determine whether a second modified datablock has been received; channelize the second modified datablock into a plurality of second subblocks of varying bit-widths such that, if an error occurred on a given row of the second modified datablock, the error will be present on a corresponding row of at least one second subblock of the plurality of subblocks; correct one or more errors contained in the plurality of second subblocks using one or more error codes appended to each second subblock of the plurality of subblocks; responsive to correcting the one or more errors, removing the one or more error codes appended to each second subblock of the plurality of subblocks; and responsive to removing the one or more error codes, combining the plurality of second subblocks into a second datablock. In some examples, the instructions further instruct the at least one processor to: increase a number of rows of a given second subblock by a number of new rows based on a respective bit-width of the given second subblock; populate a portion of the new rows with a predetermined sequence of values; and responsive to populating the portion of the new rows with the predetermined sequence of values, correcting the one or more errors contained in the plurality of second subblocks using the one or more error codes. In some examples, the instructions further instruct the at least one processor to: increase a number of rows of a given subblock by a number of new rows based on a respective bit-width of the given subblock; populate a portion of the new rows with a predetermined sequence of values; and responsive to populating the portion of the new rows with the predetermined sequence of values, determine the one or more error codes for each subblock of the plurality of subblocks based at least in part on the predetermined sequence of values. In some examples, determining the one or more respective error codes includes using, for each subblock, an encoding rate based on a narrowest subblock of the plurality of subblocks such that, responsive to appending at least one error code of the one or more error codes to each subblock, each subblock has the same number of rows.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Forward error correction techniques may correct errors in data transmitted over a telecommunication network. Many telecommunication networks may be modeled as an origin device that originates the data signal, a destination device, that is the ultimate destination of the data signal, and zero or more intermediary forwarding devices that may receive the data signal and boost the signal to account for attenuation and other issues that may arise over long distances or due to other interference. In some examples, data may be originated as a sequence of bits, encoded to one or more symbols (for example, by using distribution matching techniques and/or quadrature amplitude modulation), and then transmitted before being decoded.

During transmission, data may suffer errors, such as becoming corrupted or lost. For example, bits or symbols may suffer errors that cause the bit or symbol to change to another value or symbol, or bits or symbols may simply be dropped or missing.

To account for errors, correction codes may be used to determine which portions of the transmitted data are erroneous and may then be used to repair the data and/or correct the errors. One method of error correction is to use Reed-Solomon codes ("RS codes"). RS codes use modular arithmetic and Lagrangian interpolation to generate unique polynomials (other methods of creating RS codes also exist).

Once the error codes are created and attached to the original data, provided a sufficient portion of the data is not erroneous, the unique polynomial may be determined and used to reconstruct the original data.

With respect to RS codes, additional bits may be introduced into a sequence of bits, such as via appending, concatenation, interleaving, or other methods. As one example, if the original data is modeled as a matrix of k rows by m bits, additional bits may be appended to the bottom of each column or the end of each row. The matrix of data of k by m bits may be referred to as a datablock. The matrix formed by the combination of the original datablock with the error codes may be called a modified datablock.

RS code encoding schemes can produce additional rows at a set rate, often expressed by the relationship (k, n) where k is the number of input rows and n is the number of output rows. The number of output rows may be based on the width (in bits) of the rows (the rows generally being of consistent and identical width). That is, if a given set of rows is 8 bits wide, the value of n may be a function of 8. In some examples, the number of output rows n may equal $2^m-1$, where m is the width of the rows.

Beginning with a datablock, at least one method disclosed herein separates the datablock into an arbitrary number of channels (also called subblocks), appends error codes to the bottom of each subblock, and then recombines the data into a modified datablock that includes the error codes. Recall that the number of output rows for the encoding may depend on the width of the rows. This means that, if one subblock is x bits wide, and another subblock is y bits wide, the number of rows created by the encoding process may differ between the subblocks. The methods and systems disclosed herein provide a solution to this problem, by using innovative approaches to limit the number of rows generated for any given subblock of any given width to equal the number of rows generated by the narrowest (i.e., least wide) subblock.

Aspects of this disclosure relate to systems and methods for eliminating the need to use uniform bit-width channels when encoding data for transmission. Instead, variable-width channels may be used.

These methods and systems offer many advantages. Although general solutions are known for some RS codes, general solutions for encoding for RS codes of large or inconvenient values may not be known or may not be practical to calculate using any method. Traditional methods are computationally expensive and may be practically impossible to determine. For example, extremely large datablocks, datablocks that contain a prime number of bits, and various other cases may require serious academic research to solve, as each possible width (in bits) of the datablock corresponds to a unique RS code solution. As a result, existing techniques are not well-suited to handling data blocks of inconvenient bit-widths (e.g., 17 bits or more, such as 43 bits, 103 bits, and so on). The presently disclosed systems and methods offer fast, convenient solutions for processing datablocks of arbitrary bit widths, even when a general solution is not known or would be inconvenient or practically impossible to implement.

Figure 1:
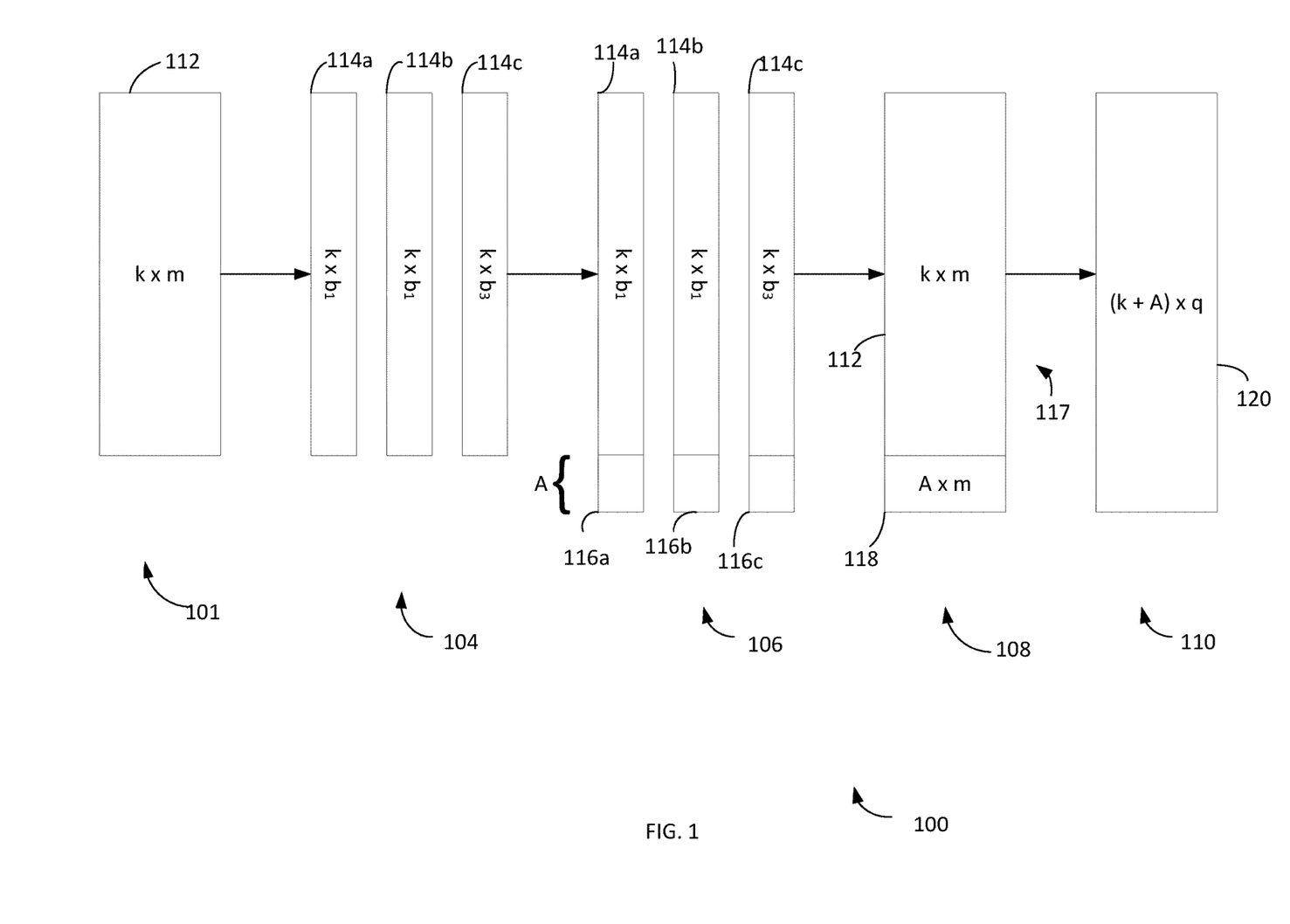
FIG. 1 illustrates a process for channelizing a datablock to apply forward error correction to the datablock according to an example.

FIG. 1 presents a process 100 of channelizing the source datablock to apply forward error correction to discrete subblocks of the source datablock according to an example. Channelizing the source datablock includes dividing the source datablock into one or more discrete subblocks, appending error correction codes to the subblocks, and then recombining the subblocks and error codes into a single block. The process 100 in FIG. 1 uses only one set of error code blocks (corresponding to outer code blocks).

FIG. 1 includes a first stage 102, a second stage 104, a third stage 106, a fourth stage 108, and a fifth stage 110. The first stage 102 includes a datablock 112, the second stage 104 includes a first subblock 114a, a second subblock 114b, and a third subblock 114c. The third stage 106 includes the first, second, and third subblocks 114a-c as well as a first error code block 116a, a second error code block 116b, and a third error code block 116c. The fourth stage 108 includes the datablock 112 and a composite error code block 118, and the fifth stage 110 includes a data unit 120.

During the first stage 102, a device, such as a controller, generates a datablock 112 of data that is intended to be transmitted using a telecommunications system. The datablock 112 is k rows by m bits. Thus, in some examples, the total number of bits contained in the datablock equals (k·m). Once the datablock 112 is created, the process 100 may continue to the second stage 104.

At the second stage 104, the controller separates the datablock 112 into a plurality of subblocks including a first subblock 114a, a second subblock 114b, and a third subblock 114c. The precise number of subblocks the controller may separate the datablock 112 into is arbitrary and may depend on the total number of bits, the width of the rows, and so forth. In some examples, the controller may break the datablock 112 into a plurality of subblocks such that a minimum subblock width is initially chosen, and then the datablock 112 is broken into an integer number of subblocks of the minimum subblock width or larger. For example, a datablock of 43 bits with a minimum subblock width of 8 bits could be divided into two 8-bit subblocks and three 9-bit wide subblocks, or one 8-bit wide subblock, two 9-bit wide subblocks, and one 17-bit wide subblock, and so forth.

In the example given in the second stage 104 of FIG. 1 the datablock 112 is broken into three subblocks. The first subblock 114a includes k rows and is $b_1$ bits wide. The second subblock 114b includes k rows and is $b_2$ bits wide. The third subblock 114c includes k rows and is $b_3$ bits wide. The values of $b_1$, $b_2$, and $b_3$ may be different from one another or equal to one another. For example, if the datablock 112 was 25 bits wide, and 8 bits was chosen by the controller as the minimum bit-width for the subblocks 114a-c, then b and $b_2$ could be 8 bits wide and $b_3$ could be 9 bits wide. Once the subblocks 114a-c have been designated, the process 100 may continue to the third stage 106.

At the third stage 106, the controller appends error codes to the bottom of each column of each subblock. For example, the controller may append a first error code block 116a to the bottom of the first subblock 114a, a second error code block 116b to the bottom of the second subblock 114b, and a third error code block 116c to the bottom of the third subblock 114c. Each error code block 116a-c provides forward error correction for the particular subblock 114a-c those error codes are associated with. Thus, the first error code block 116a provides forward error correction for the first subblock 114a, the second error code block 116b provide forward error correction for the second subblock 114b, and so forth. In general, each error code block 116a-c will have A rows and width equal to or corresponding to the width of its respective subblock 114a-c. As a result, the first subblock 114a may be A rows by $b_1$ bits, the second subblock 114b may be A rows by $b_2$ bits, and the third subblock 114c may be A rows by $b_3$ bits. Once the error code blocks 116a-c are appended to the subblocks 114a-c, the process 100 may continue to the fourth stage 108.

During the fourth stage 108, the controller recombines the subblocks 114a-c and error code blocks 116a-c into a composite datablock 217 (also called a modified datablock). The composite datablock 217 comprises two parts, a first part corresponding to the datablock 112 and a composite error code block 118. The composite error code block 118 is composed of the error code blocks 116a-c of the third stage 106. The composite datablock 217 is as wide as datablock 112, but has A additional rows. Thus, the total number of bits in the composite datablock 217 may equal ((k+A)·m). Once the controller has created the composite datablock 217 by combining the subblocks 114a-c and error code blocks 116a-c, the process 100 may continue to the fifth stage 110.

During the fifth stage 110, the controller may transform the composite datablock 217 into a data unit 120. The data unit 120 may be provided to a transmission and/or storage system for use. For example, the data unit 120 may be transformed into rows of symbols, where each symbol corresponds to one or more bits and/or a unique sequence of bits using a technique such as Quadrature Amplitude Modulation (QAM) encoding techniques and/or data constellation encoding techniques, distribution matching, and so forth. In some examples where a technique like QAM is used to transform the data unit 120, the data unit 120 may have (k+A) rows, each row containing q symbols. The number of symbols per row, q, does not necessarily equal the number of bits per row of the datablock 112.

Figure 2:
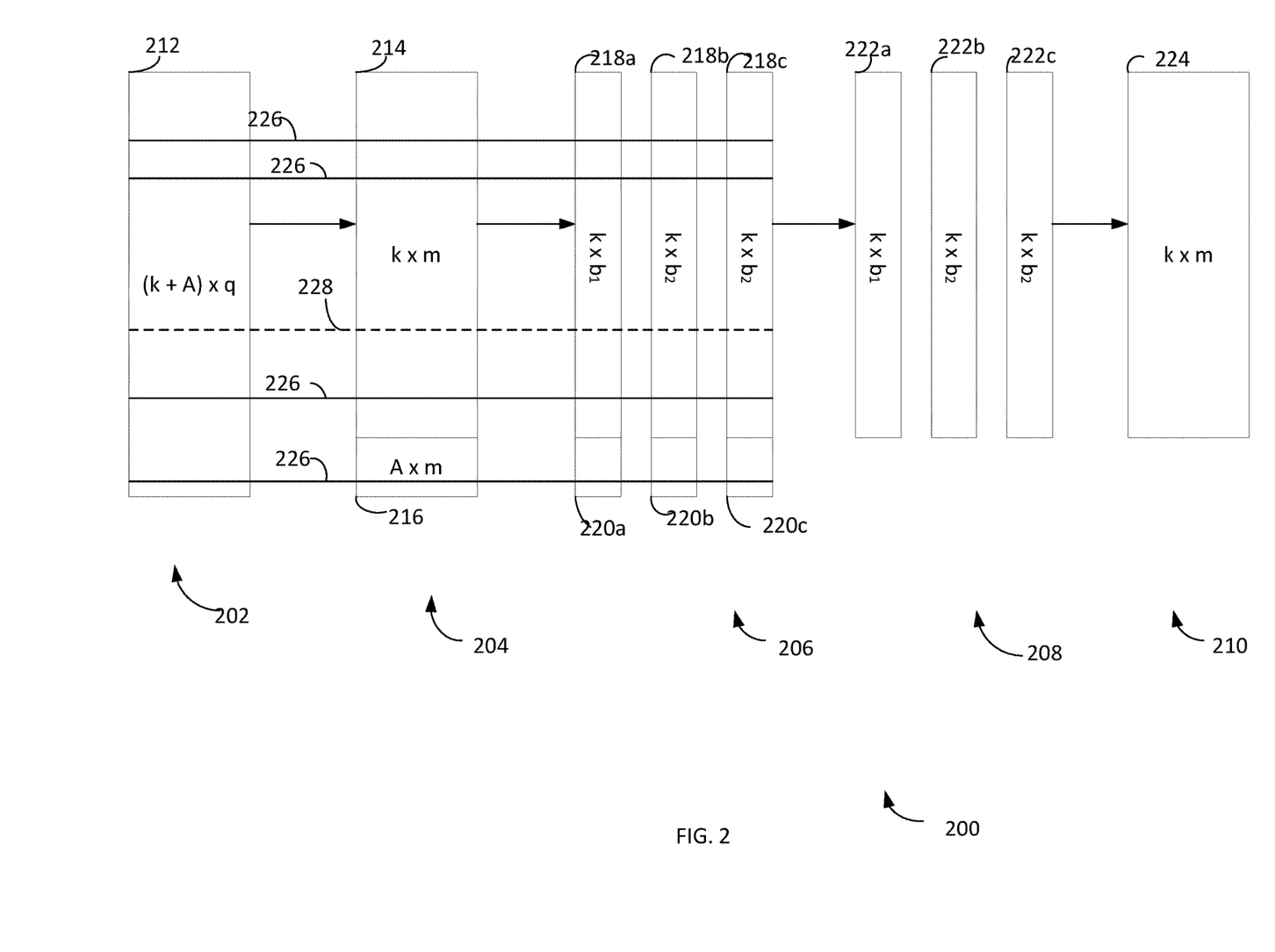
FIG. 2 illustrates a process for decoding a datablock according to an example.

Having shown the encoding process using channelized techniques in FIG. 1, FIG. 2 now illustrates the decoding process 200 using channelized techniques according to an example.

Process 200 includes a first stage 202, a second stage 204, a third stage 206, a fourth stage 208, and a fifth stage 210.

In the first stage 202, a controller receives a data unit 212 of (k+A) rows from one or more other devices or transmitters. However, the received data unit 212 may contain errors which may be either unknown errors 226 or known errors 228 ("erasures 228"). An unknown error 226 is an error that is not immediately apparent. An erasure 228 is an error that is immediately apparent.

For example, a given row may contain a sequence of bits or valid symbols in a valid order (a sequence of valid symbols in a valid order is a valid "word."-a "word" is a sequence of symbols), however the bits, word and/or one or more of the symbols may nonetheless be wrong despite appearing valid and being in a valid order. Such an error is an unknown error 226 because it would not be immediately obvious that the bits, word and/or symbols were incorrect. On the other hand, in some cases a given row may contain an invalid value, such as a sequence of bits that is invalid, a word that is not within the library of valid words or a symbol that is not within the library of valid symbols. Such an error is an erasure 228 because the controller can immediately determine that the data is incorrect. Erasures 226 and unknown errors 228 may be present in any part of the data, including the portions of the data comprising the error correction codes. Once the controller receives the data unit 212, the process 200 may continue to the second stage 204.

During the second stage 204, the controller decodes the data unit 212 into a datablock 214 and an error code block 216. The datablock 214 may be k rows by m bits. The error code block 216 may by A rows by m bits. The error code block 216 may be appended to the bottom of the datablock 214, though in principle the error code block 216 may be appended anywhere (for example, the rows of datablock 214 and rows of error code block 216 may be interleaved in a known and/or predetermined pattern). Note that, at this point, the controller has decoded the q symbols of each row of the data unit 212 that comprise the datablock 214 and error code block 216. Known errors 226 and unknown errors 228 may still be present. Once the controller has decoded the data unit 212, the process 200 may continue to the third stage 206.

During the third stage 206, the controller channelizes the datablock 214 and error code block 216, to reconstruct the subblocks of the datablock 214 and error code block 216. In some examples, this operation may be an inverse or reversal of the operations of the third stage 106 of FIG. 2. In some examples, the controller may decompose the datablock 214 and error code block 216 into a first data subblock 218a, a second data subblock 218b, a third data subblock 218c, a first error code subblock 220a, a second error code subblock 220b, and a third error code subblock 220c. The total number of subblocks may be arbitrary and may depend on the number of subblocks used during the encoding process (e.g., during the process 100, third stage 106, of FIG. 2). In some examples, the total number of subblocks exactly matches the number of subblocks used during the encoding process. Each data subblock 218a-c may have k rows, each respective data subblock 218a-c may have a respective width, in bits, of $b_1$, $b_2$, $b_3$, and so forth. Each data subblock 218a may have a respective error code subblock appended to the bottom, such that the first error code subblock 220a is appended to the bottom of the first data subblock 218a, the second error code subblock 220b is appended to the bottom of the second data subblock 218b, the third error code subblock 220c is appended to the bottom of the third data subblock 218c, and so forth. The error code subblocks may have the same width (in bits) as the data subblocks to which they are appended.

Once the controller has channelized the datablock 214 and error code block 216 into the subblocks, the controller may begin error correction. Depending on the forward error correction technique used, if the number of errors (known or unknown) exceed a given threshold, it may be impossible or effectively (if not actually) impossible to correct and/or repair the errors. Such thresholds may depend on the forward error correction technique used and whether the errors are known or unknown. For example, erasures may be easier to correct because erasures are definitely wrong, while unknown errors may—from the perspective of the controller—appear to be as valid as correct data for a longer period of time or until examined more closely.

The controller may perform error correction on a channel-by-channel basis. For example, the combined data within the first data subblock 218a, the first error subblock 220a, locations of erasures 226 and unknown errors 228 within those subblocks, may compromise the full set of details for "channel A". The controller may perform error correction for "channel A" using the full set of details for "channel A". The controller may perform the same error correct for any and/or every other channel. The channels may be processed in sequence or in parallel. For example, if RS codes were used, for each and every channel, the controller should be able to determine the unique polynomial corresponding to the data in that channel, and then identify which rows contain bits and/or sequences of bits that do not match the unique polynomial. Once every channel has been processed the error correction is complete, and the process 200 may continue to the fourth stage 208.

During the fourth stage 208, the controller removes the error code subblocks 220a-c from the data subblocks 218a-c, leaving just the corrected data subblocks 222a-c. The controller may, for example, remove the first through third error code subblocks 220*a-c* from the data subblocks 218*a-c* to produce, respectively, a first corrected subblock 222*a*, a second corrected subblock 222*b*, and a third correct subblock 222*c*. The process 200 may then continue to the fifth stage 210.

During the fifth stage 210, the controller combines the first through third corrected subblocks 222*a-c* into a corrected datablock 224. The corrected datablock 224 may be identical to or contain identical information to the original data that was transmitted (e.g., corrected datablock 224 may be identical or functionally identical to the datablock 112 of FIG. 1). The corrected datablock 224 may have k rows each m bits wide. The corrected datablock 224 may be provided, by the controller or a subprocess running on the controller, to other devices, processes, or applications for use.

To summarize the processes described with respect to FIGS. 1 and 2, an initial matrix of data is received, the data is broken into channels (which are essentially sets of columns of the data), error codes are appended to each channel, the channels are combined together, and the combined data is transmitted (and possibly encoded into symbols). The data is then transmitted and received, where the symbols are decoded if necessary, the data is broken into channels, error correction is performed, the corrected channels are recombined, and then the data is available for use.

As mentioned earlier, not all channels (or subblocks) of the datablock need to be the same width. For example, some subblocks (e.g., subblock 116*a* of FIG. 2) may be 8 bits wide, while other subblocks (e.g., subblock 116*b* of FIG. 2) may be 9 bits wide, and still other subblocks may have other bit widths. In the foregoing FIGS. 2 and 3, these widths were expressed in terms of $b_1$ through $b_3$. However, as previously mentioned, it is possible to encode all of these subblocks using the same encoding rate, as will be discussed with respect to the FIG. 3.

Figure 3:
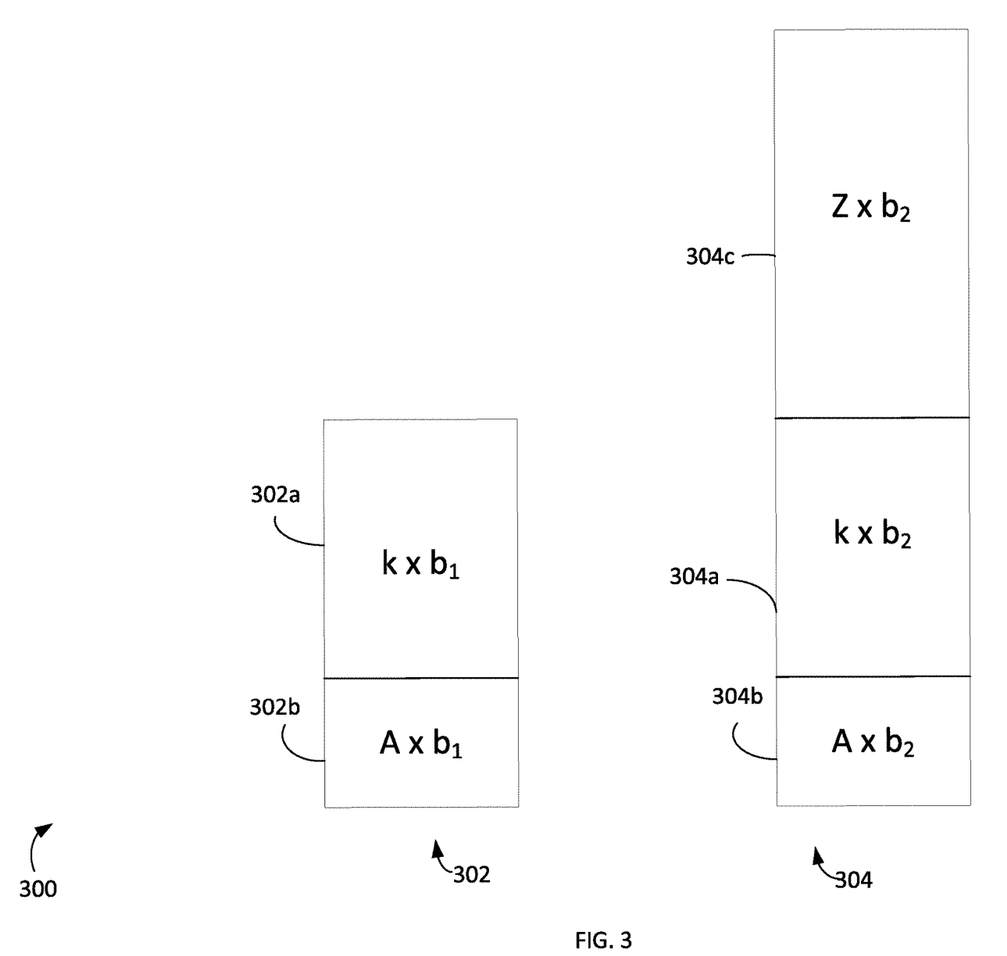
FIG. 3 illustrates two datablocks of varying bit-widths according to an example.

FIG. 3 illustrates an example 300 of two subblocks of different widths. The example 300 includes a first subblock 302 divided into a data section 302*a* and an error correction code section 302*b*, as well as a second subblock 304 divided into a data section 304*a*, an error correction code section 304*b*, and a padding section 304*c*. The first subblock 302 and each of its subsections, including the data section 302*a* and error correction code section 302*b*, are $b_1$ bits wide. The second subblock 304 and each of its subsections, including the data section 304*a*, the error correction code section 304*b*, and the padding section 304*c*, are $b_2$ bits wide. The values $b_1$ and $b_2$ are not equal in this example (though they may be equal in some examples).

Each subblock may be thought of as a sequence of values, from top to bottom, where each row corresponds to a particular value. The data sections 302*a*, 304*a* may be k rows long, and the error correction code sections 302*b*, 304*b* may be A rows long. Thus, there may be (k+A) particular values per data section 302*a*, 304*a* after creation of the error codes (that is, each row may correspond to a particular value, expressed in bits). Using a method of interpolation (for example, Lagrangian interpolation), it is possible to derive a unique function that corresponds to the exact order of values in each data section 302*a*, 304*a*. For example, if the first data section 302*a* of the first subblock 302 contains the values 1, 4, and 9 in that order (e.g., "1" on the first row. "4" on the second row, and so forth), it is possible to associate those values with the points (0, 1), (1, 4), and (2, 9), where the X coordinate is the index of the value and the Y coordinate is the value contained in the data section 302*a*, 304*a* at that index. Using these points, it is possible to derive a function that will have the solutions $f(0)=1$, $f(1)=4$, and $f(2)=9$. Note that the functions used in FEC encoding and to determine RS codes may include other operations and/or be modular.

Once such a function is derived, it is possible to solve the function for $f(4)$, $f(5)$ and/or $f(x)$, where x is any value. The error code correction subblocks 302*b*, 304*b* may be formed by solving the function for the desired index (in this example, $f(4)$ and $f(5)$), and then inserting the solution value into the subblock 302, 304 at that index. That is, the error code correction subblocks 302*b*, 304*b* may have the values corresponding to $f(4)$ in their first row, and $f(5)$ in their second row, and so forth for every following row until $f(x)$. The error code blocks of the foregoing examples of FIGS. 1-3 may be constructed from these error codes in this way.

If data is lost or corrupted, the remaining non-erroneous values and indices may be used to reconstruct the unique function and recalculate the erroneous values, thus allowing the data to be fully repaired. The foregoing is just one example of forward error correction, and other methods are also possible.

With RS codes and some other types of forward error correction, the width of the error codes (e.g., the width of at least one and possibly all of the rows of the error code subblock) is determined by the width of the corresponding data (e.g., the width of a given row of the data subblocks). That is, because the first data section 302*a* is $b_1$ bits wide, the first error correction code section 302*b* may be $b_1$ bits wide. Likewise, because the second data section 304*a* is $b_2$ bits wide, the second error correction code section 304*b* may be $b_2$ bits wide.

However, RS coding (and some other forms of FEC) have a property whereby for a given width of data (e.g., using a width of $b_1$ bits), the number of output rows will equal $2^{b_1}-1$. This relation for the number of output rows is true in a strict sense, and the number of output rows that contain data of concern may be a lower number; we will explain in the following paragraphs how this may be achieved. For example, for a width of 8 bits, the number of output rows may equal 255 (i.e., $2^8-1$). More generally, for a data block of width m (in bits), the number of output rows may be $2^m-1$. Therefore, however many rows k are initially present, the number of rows produced by the encoding process may be a function of the width of the k rows.

Returning to FIG. 2, if by is less than $b_2$, for example, then the total number of rows after encoding (e.g., k+A) should not be the same for the first channel and the second channel. Yet, as FIG. 2 illustrates, each channel has the same number of rows throughout the process. That is, the sum of the rows of the first subblock 114*a* and first error code block 116*a* equals the sum of the rows of the second subblock 114*b* and the second error code block 116*b* despite the fact that $b_1$ and $b_2$ may not be equal. This would appear to contradict the relationship described above, where the number of output rows depends on the width of the row.

FIG. 3 demonstrates a solution to the issue described above. In FIG. 3, $b_2$ is wider than $b_1$ by some amount. That is $b_2$ is at least one bit wider than $b_1$. However, because of the choices made earlier in the encoding process, the data sections 302*a*, 304*a* contain an equal number of rows—the only difference is the width of those rows. The padding section 304*c* represents the extra rows created by the encoding of the second data section 304*a* compared to the first data section 302*a*. The padding section 304*c* may be any set of predetermined or preset values. In other words, the padding section 304*c* may be determined ahead of time and used as part of the encoding process for the second data section 304*a*. When the encoding of the second data section 304*a* is complete (that is, the second error correction code section 304b has been produced), the padding section 304c may be discarded.

As an example, padding section 304c may contain a predetermined sequence of bits (e.g., all zeroes, all ones, or some known sequence of 1s and 0s). The values of each row of the padding section 304c, combined with the values of each row of the second data section 304a, may be used to derive a unique function to determine the values of each row of the second error correction code section 304b. The number of rows of the padding section 304c can be chosen such that the number of rows available for error codes is equal to A. To make this example more concrete, consider a situation where by is 8 bits and k is 201. As a result, A would be 54, because 201 rows of 8 bits each leaves 54 rows of 8 bits each for error codes. Now consider the situation where $b_2$ is 9 bits. As a result, we have k rows each 9 bits wide. k was previously established to be 201, and A was previously established to be 54. However, with $b_2$ being 9 bits, the encoding will produce 511 rows. Therefore, Z must be 256, meaning that the padding section 304c contains 256 rows of 9 bits each. This is such that (Z+k) equals 457, leaving 54 rows for error codes. This process may be expanded, such that for any value of $b_2$ the number of rows Z of the padding section 304c may be chosen such that (k+A) is constant for each channel regardless of the width of that channel. Then the Z rows of the padding section 304c are discarded. Because the padding section 304c is predetermined, during decoding the padding section 304c can simply be added back to the second data section 304a and second error correction code section 304b via concatenation (or an equivalent process).

A key feature of encoding the channels in this way is that errors will be aligned across channels. With reference to FIG. 2, the channelization process is such that, when a modified datablock is channelized (e.g., upon receipt at a receiver of a modified datablock sent from a transmitter, and decomposition of that modified datablock into a plurality of channels), the erasures and unknown errors 226, 228 may be aligned such that, in each channel (as shown in the third stage 206) the errors 226, 228 are present on the same row. That is, if an error occurred in row 3, then in each channel or subblock 218a-c, 220a-c the error occurs on row 3 as well. In general, this means that for any error occurring in a given row of the modified datablock, the error is present or at least may be present in each corresponding row of each channel once the modified datablock is channelized. As a result, the locations of all erasures in each channel and in the modified datablock are known because an erasure on a given row of the modified datablock will be present in the corresponding row of at least one channel or every channel. In some examples, this phenomena may be referred to as "error striping" or simply "striping." With respect to FIG. 3, this is equivalent to saying that if an error occurred in a given row of the first data section 302a or second data section 304a, or the first error correction code section 302b or the second error correction code section 304b, the error will occur in the same row of that corresponding section because the sections are aligned. Thus, the error correction capacity of this approach to FEC encoding is at least equal to that of approaches that do not use channelization.

When using fixed FEC coding rates, as discussed above, the smallest bit-depth (e.g., the least wide subblock or channel) will determine the set of possible coding rates. For example, the first data section 302a is 8 bits wide and the second data section 304a is 9 bits wide. Therefore, since the first data section 302a is the less wide (or less deep) at 8 bits, the 8 bit depth of the first data section 302a will determine the set of possible encoding rates (k, n), and will dictate that the final channels all be $2^8-1$ rows long.

Figure 4:
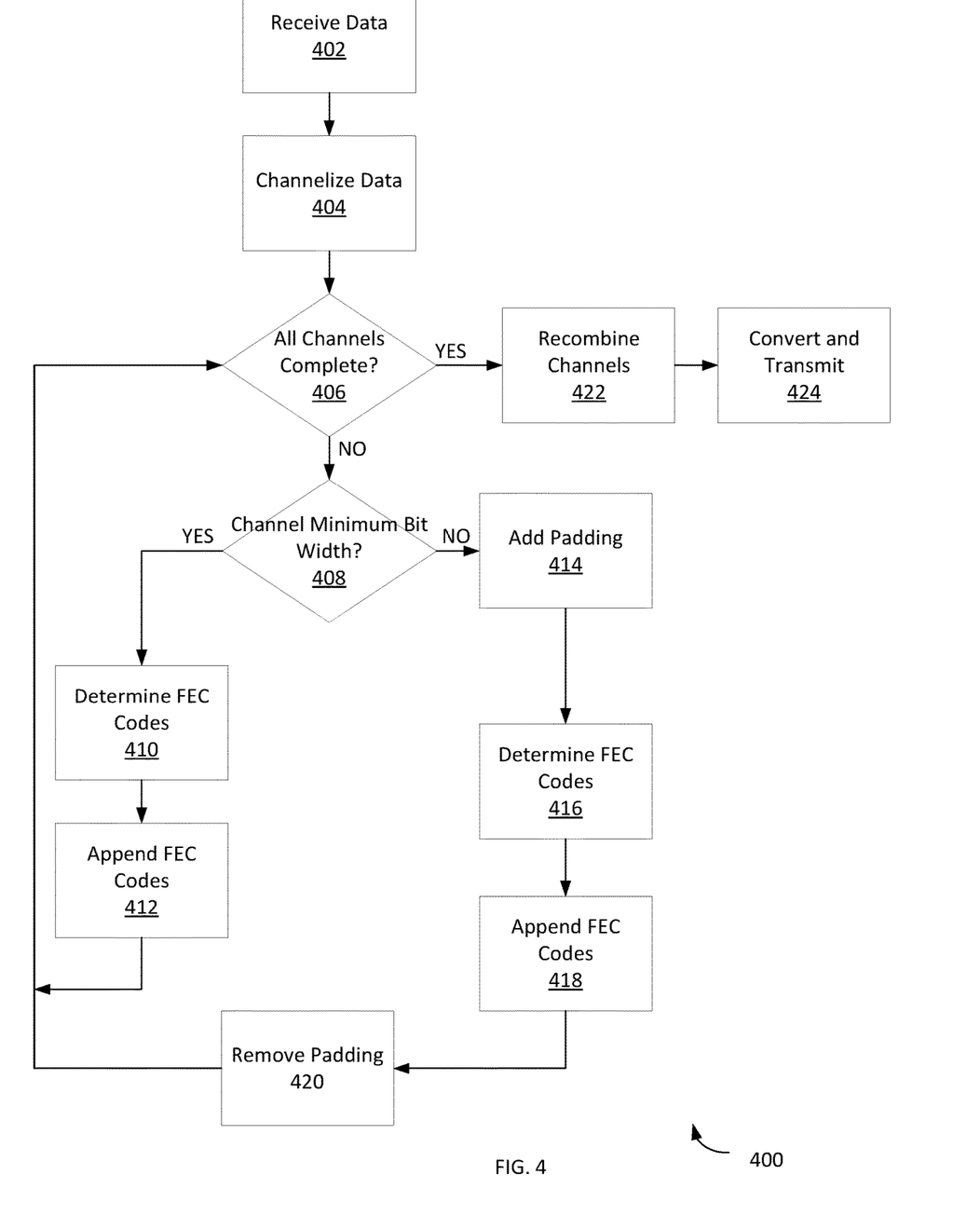
FIG. 4 illustrates a process for transmitting and encoding data according to an example.

FIG. 4 illustrates a process 400 for encoding and transmitting data. In short, the process 400 involves receiving data to encode and transmit, separating the data into channels, and then appending forward error codes to each channel before recombining the channels and transmitting the data.

At act 402, at least one controller ("controller") receives data to transmit. The controller may be any kind of device capable of sending and receiving data (e.g., engaging in telecommunications), and may include circuitry capable of channelizing data, determining FEC codes, appending FEC codes to data, recombining the channels, converting the data into a data unit, and transmitting the data. Thus, the controller may include a processor, microcontroller, and so forth. The received data may be generated by an application or process, including a process (such as a computer program) running on the controller. The process 400 may then continue to act 404.

At act 404, the controller separates the data into one or more channels. The number of channels may be based on a minimum bit-width for FEC encoding. For example, if the data has a given number of rows, each row being 17 bits wide, and the minimum bit-width for FEC encoding is 8 bits, the controller may determine that each channel should be at least 8 bits wide. The controller could then separate the data into two channels both having the given number of rows, where the first channel was 8 bits wide and the second channel was 9 bits wide. Other examples are also possible. For example, if the minimum bit-width for FEC encoding was 5 bits, and there are a given number of rows each 18 bits wide, then the controller could separate the data into two channels each 5 bits wide, and one channel that is 8 bits wide. Any combination of widths may be used provided no channel is less than the minimum bit-width chosen for the FEC encoding. Once the channels are created, the process 400 may continue to act 406.

At act 406, the controller determines if every channel has been appended with a FEC code. If the controller determines that every channel has been appended with a FEC code (406 YES), the process 400 continues to act 422. If the controller determines that not every channel has been appended with a FEC code (406 NO), the controller selects a channel to append FEC codes to (that has not yet received FEC codes), and the process 400 continues to act 408. While FEC codes are discussed as being appended to the channels, it is not necessarily the case that the FEC codes must be appended to the channels. In some examples, the FEC codes may be placed at the top of the columns rather than the bottom, or may be interleaved. The only requirement is that each error code be placed on its own row and that the rows that are to contain error codes be known.

At act 408, the controller determines whether the selected channel is the minimum bit width. If the controller determines the selected channel is the minimum bit width (408 YES), the process continues to act 410. If the controller determines that the selected channel is not the minimum bit width (408 NO), the process continues to act 414.

At act 410, the controller determines and appends FEC codes to the selected channel. The controller may determine the FEC codes using any known method, such as those described herein. For example, the controller may construct a unique polynomial function based on the index and value of a row of data, and then determine additional values for additional indices to append to the existing rows of data. The following table shows one example:

| Index | Value (binary) | Value (base 10) |
|---|---|---|
| Known Values | | |
| 0 | 00001 | 1 |
| 1 | 00100 | 4 |
| 2 | 01001 | 9 |
| New Values | | |
| 3 | 10000 | 16 |
| 4 | 11001 | 25 |

In this table, the known values are 1, 4, and 9. By function fitting, the function that provides these values $f(x)=(x+1)^2$. By plugging f(3) and f(4) into the function, the controller can determine two new values, specifically that f(3)=16 and f(4)=25. The process 400 may then continue to act 412.

At act 412, having determined the two new values, the controller can append the new values to the original data. The following shows one example of the operation, where the original data is to the left of the arrow and the new data is to the right of the arrow.

```
00001              00001
00100      →       00100
01001              01001
                   10000
                   11001
```

Having appended the new values to the channel, the process 400 may return to act 406 to check whether additional channels have not yet received FEC codes. In some examples, each additional row appended to the data may represent an additional row of data that can be lost before recovery becomes difficult or impossible. For example, if there are 10 rows of data and 5 rows of error codes, then up to 5 total rows can be lost or erroneous and the data can still be recovered. In general, a given number of erasures may occur or up to half as many unknown errors. In some examples, the total number of errors may be constrained by the inequality $E+2U \leq A$, where E is the number of erasures, U is the number of unknown errors, and A is number of error codes.

At act 414, the controller may determine an amount of padding to add to the channel. The controller may determine a number of rows of padding to add such that the total number of rows inclusive of the padding would be equal to the encoding output based on the width of the channel. The controller may also choose the amount of padding to add based on the number of rows of error codes present with respect to the least-wide channel. Thus, in some examples, the number of rows of original data and error codes not inclusive of the padding will equal the number of rows produced by the (k, n) encoding of the least-wide channel. the process 400 may then continue to act 416.

At act 416, the controller determines the FEC codes. However, unlike act 410, the channel is not the minimum bit-width. Instead, the channel may be 1 or more bits wider than the minimum bit-width. For example, if the minimum bit-width is 5 bits, the channel may be 6, 7, 8, or more bits wide. As a result, the number of output rows for the encoding process may increase, as described with respect to FIG. 3. As a result, prior to determining the FEC codes, the controller may concatenate the rows of data with additional rows containing a predetermined sequence of bits. In some example, the controller may add the rows of predetermined bits to the beginning of the channel, such that the predetermined bits proceed the data. The controller may then calculate the error codes based on the rows of predetermined bits and the rows of data. The process 400 may then continue to act 418.

At act 418, the controller appends the error codes to the data and removes the rows of predetermined bits from the channel. The process 400 may continue to act 420.

At act 420, the controller may remove the padding from the channel. For example, any additional rows added as padding to the channel may be removed such that only original data and error codes remain. The process 400 may then return to act 406.

At act 422, the controller combines the separate channels into a single datablock. For example, if the original data was channelized into multiple channels, the controller now recombines those channels with the additional error code data included, to create a new datablock having the same width as the original datablock and a number of additional rows equal to the number of rows of error codes created during acts 410, 412, and 416, and 418. The process 400 may then continue to act 424.

At act 424, the controller may map the rows or portions of the rows to symbols or other encodings representing those rows or portions of rows. In some examples, the symbols may be chosen using a data constellation where a given amplitude and/or frequency and/or phase corresponds to a given string of bits. Once the encoding is complete, the controller may transmit the encoded data to another device, process, or application.

Figure 5:
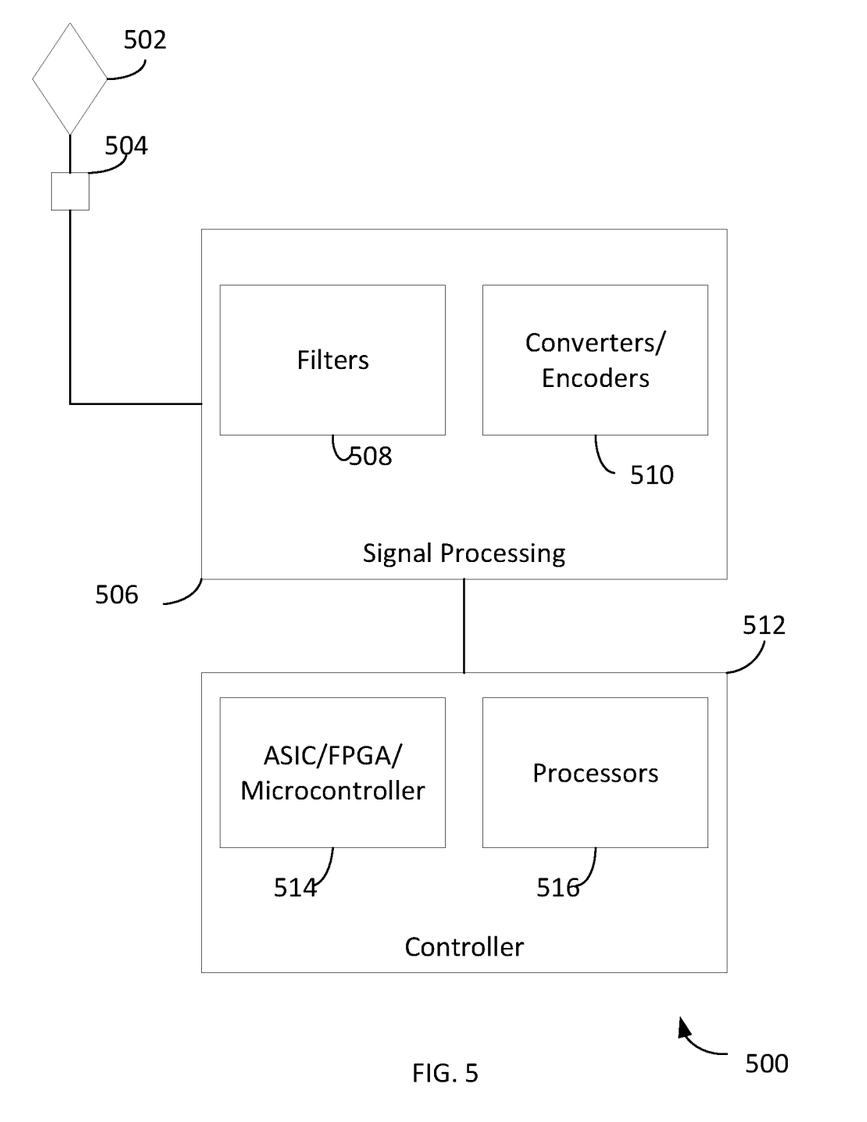
FIG. 5 illustrates a communication device according to an example.

FIG. 5 illustrates a communication system 500 according to an example. The communication system 500 includes at least one transmission element 502 ("transmission element 502"), a node 504, a signal processing circuit 506 which may include one or more filter 508 and/or one or more converters 510, and a controller 512 which may include one ore more microcontrollers 514 and/or one or more processors 516.

The transmission element 502 may be a connection or type of connection configured to send and/or receive telecommunication signals. For example, the transmission element 502 may be an antenna (such as a radio or satellite antenna), an ethernet connection, a wireless internet connection, a serial port, and so forth. In general, the transmission element 502 may be a transmitter, receiver, or transceiver or may be configured to operate in any mode corresponding to transmitting and/or receiving a signal.

The node 504 may be an element configured to link the transmission element 502 to the signal processing circuitry 506. The node 504 may be, for example, a universal serial bus connection, a serial connection, a peripheral component interface, or any other type of connection. In some examples, the node 504 may be optional and/or omitted. For example, the transmission element 502 may be coupled directly to the signal processing circuitry 506. In other examples, the communication system 500 may support multiple types of transmission element 502, and thus the node 504 may be configured to connect to multiple types of transmission elements. For example, the node 504 may be configured and/or have a plurality of connections that allow the signal processing circuitry 506 to receive and/or send signals to antennas, ethernet connections, serial ports, and so forth.

The signal processing circuitry 506 is configured to process telecommunication signals. The signal processing circuitry 506 may perform any desirable operation on a telecommunication signal. For example, the signal processing circuitry 506 may encode the signal according to a desired encoding, or decode the signal, or modify an encoding of a signal. The signal processing circuitry 506 may convert the signals from analog-to-digital form, digital-to-analog form, or any other form (e.g., discrete, continuous, and so forth). The signal processing circuitry 506 may filter the signal, for example, by providing band-pass, band-reject, high-pass, low-pass, and other kinds of filtering. The signal processing circuitry 506 may also amplify the signal. In general, the signal processing circuitry 506 may adjust any part of the signal, including phase, frequency, amplitude, duration, power, and so forth as applicable for a signal of a given type (discrete, continuous, hybrid, and so forth).

In some examples, the signal processing circuitry 506 may include one or more filters 508. The one or more filters 508 may filter the signal by, for example, attenuating portions of the signal corresponding to given frequencies (high-pass, low-pass, band-pass, band-reject, and so on), whether the signal is digital (discrete), analog (continuous), or hybrid in nature.

In some examples, the signal processing circuitry 506 may include one or more converters and/or encoders 510 ("converters 510"). The converters 510 may convert the signal from analog-to-digital form, digital-to-analog form, and so forth. The converters 510 may also encode the signal, modulate the signal, and so forth. In some examples, the modulation may include amplitude modulation, frequency modulation, or any other kind of modulation.

The signal processing circuitry 506 may be coupled to the controller 512 and the controller 512 and signal processing circuitry 506 may send and/or receive data between them.

The controller 512 is configured to control the communication system 500. For example, the controller 512 may control the type of filtering, converting, encoding, modulation, and so forth, performed by the signal processing circuitry 506 and/or the constituent elements of the signal processing circuitry 500.

In some examples, the controller 512 may include one or more microcontrollers 514. The one or more microcontrollers 514 includes traditional microcontrollers as well as application specific integrated circuits (ASICs), field programmable gate arrays, or any other type of circuit or system capable of performing general processing operations. In some examples, the controller 512 may be a traditional microcontroller, ASIC, FPGA, or other type of specialized circuitry.

In some examples, the controller 512 may include one or more processors 516. The one or more processors 516 may be capable of performing general processing operations and/or may be tailored to specific purposes.

With respect to the foregoing FIGS. 1-4, the communication system 500 may send or receive datablocks (including modified datablocks), may encode and decode datablocks (including modified datablocks), may channelize datablocks (including modified datablocks), and so forth.

For example, the controller 512 may be configured to receive a datablock, channelize the datablock, pad the channels as necessary, determine the error codes for each channel, append the error codes to the datablock, remove the padding (e.g., the padded data), recombine the channels into a modified datablock, and then transmit and/or encode the datablock.

The controller 512 may be configured to receive a modified datablock, decode the modified datablock as necessary, channelize the modified datablock, pad the channels as necessary, correct errors for each channel, remove the error codes from the datablock, remove the padding, recombine the channels into a datablock, and then use the datablock and/or provide the datablock to another system or device.

Various controllers, such as the controller mentioned with respect to FIG. 4 or FIG. 5, may execute various operations discussed above. Using data stored in associated memory and/or storage, the controller also executes one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A system for encoding and correcting data using variable-width channels, the system comprising:
   transmitter circuitry; and
   at least one controller comprising processing circuitry configured to:
   channelize a datablock into a plurality of data subblocks of varying bit-widths including at least a first data subblock and a second data subblock having a same number of rows, the first data subblock having a number of columns equal to a first bit width, the second data subblock having a number of columns equal to a second bit width, the second bit width being at least one bit greater than the first bit width;
   determine one or more error correction codes for each data subblock of the plurality of data subblocks, the error correction codes for the data subblocks determined using a same encoding rate based on a lowest bit width of the data subblocks,
   wherein the error correction codes for the first data subblock comprises a first subblock of error-corrections bits having a first number of rows and the first bit width,
   wherein the error correction codes for the second data subblock comprises a second subblock of error-correction bits having a second number of rows and the second bit width, the second number of rows being greater than the first number of rows;
   wherein the second subblock of error-correction bits comprises a padding section and an error-correction section, the padding section comprising a predetermined sequence of values;

wherein the padding section has a number of rows equal to a difference between the first and second number of rows and the error-correction section has a number of rows equal to the first number of rows, wherein the processing circuitry is configured to determine the error correction codes that comprise the error correction section based on a solution to a function that includes the predetermined sequence of values;

append the one or more error correction codes to each data subblock of the plurality of data subblocks, wherein the first subblock of error correction bits is appended to the first data subblock and the second subblock of error correction bits is appended to second data subblock after removal of the padding section; and combine the plurality of data subblocks with the appended error correction codes into a modified datablock, wherein the at least one controller configures the transmitter circuitry to transmit the modified datablock over a communication medium to a receiver for subsequent decoding, the receiver configured to retrieve a corresponding predetermined sequence of values comprising the padding section from memory and append the padding section to the modified datablock for decoding and error correction.

2. The system of claim 1 wherein the controller is further configured to:

increase a number of rows of a given subblock by a number of new rows based on a respective bit-width of the given subblock;

populate the new rows with the predetermined sequence of values; and responsive to populating the new rows with the predetermined sequence of values, determine the one or more error codes for each subblock of the plurality of subblocks based at least in part on the predetermined sequence of values.

3. A method for encoding and correcting data performed by processing circuitry, the method comprising:

channelizing a datablock into a plurality of data subblocks of varying bit-widths including at least a first data subblock and a second data subblock having a same number of rows, the first data subblock having a number of columns equal to a first bit width, the second data subblock having a number of columns equal to a second bit width, the second bit width being at least one bit greater than the first bit width;

determining one or more error correction codes for each data subblock of the plurality of data subblocks, the error correction codes for the data subblocks determined using a same encoding rate based on a lowest bit width of the data subblocks, wherein the error correction codes for the first data subblock comprises a first subblock of error-corrections bits having a first number of rows and the first bit width, wherein the error correction codes for the second data subblock comprises a second subblock of error-correction bits having a second number of rows and the second bit width, the second number of rows being greater than the first number of rows;

wherein the second subblock of error-correction bits comprises a padding section and an error-correction section, the padding section comprising a predetermined sequence of values;

wherein the padding section has a number of rows equal to a difference between the first and second number of rows and the error-correction section has a number of rows equal to the first number of rows, wherein the method further comprises:

determining the error correction codes that comprise the error correction section based on a solution to a function that includes the predetermined sequence of values;

appending the one or more error correction codes to each data subblock of the plurality of data subblocks, wherein the first subblock of error correction bits is appended to the first data subblock and the second subblock of error correction bits is appended to second data subblock after removal of the padding section; and combining the plurality of data subblocks with the appended error correction codes into a modified datablock, wherein the processing circuitry configures transmitter circuitry to transmit the modified datablock over a communication medium to a receiver for subsequent decoding, the receiver configured to retrieve a corresponding predetermined sequence of values comprising the padding section from memory and append the padding section to the modified datablock for decoding and error correction.

4. The method of claim 3 further comprising:

increasing a number of rows of a given subblock by a number of new rows based on a respective bit-width of the given subblock;

populating a portion of the new rows with the predetermined sequence of values; and responsive to populating the portion of the new rows with the predetermined sequence of values, determining the one or more error codes for each subblock of the plurality of subblocks based at least in part on the predetermined sequence of values.

5. A non-transitory computer-readable medium containing thereon instructions for encoding and correcting data, the instructions instructing at least one processor to:

channelize a datablock into a plurality of data subblocks of varying bit-widths including at least a first data subblock and a second data subblock having a same number of rows, the first data subblock having a number of columns equal to a first bit width, the second data subblock having a number of columns equal to a second bit width, the second bit width being at least one bit greater than the first bit width;

determine one or more error correction codes for each data subblock of the plurality of data subblocks, the error correction codes for the data subblocks determined using a same encoding rate based on a lowest bit width of the data subblocks, wherein the error correction codes for the first data subblock comprises a first subblock of error-corrections bits having a first number of rows and the first bit width, wherein the error correction codes for the second data subblock comprises a second subblock of error-correction bits having a second number of rows and the second bit width, the second number of rows being greater than the first number of rows;

wherein the second subblock of error-correction bits comprises a padding section and an error-correction section, the padding section comprising a predetermined sequence of values;

wherein the padding section has a number of rows equal to a difference between the first and second number of rows and the error-correction section has a number of rows equal to the first number of rows, wherein the at least one processor is configured to determine the error correction codes that comprise the error correction section based on a solution to a function that includes the predetermined sequence of values;

append the one or more error correction codes to each data subblock of the plurality of data subblocks, wherein the first subblock of error correction bits is appended to the first data subblock and the second subblock of error correction bits is appended to second data subblock after removal of the padding section; and combine the plurality of data subblocks with the appended error correction codes into a modified datablock, wherein the at least one processor configures transmitter circuitry to transmit the modified datablock over a communication medium to a receiver for subsequent decoding, the receiver configured to retrieve a corresponding predetermined sequence of values comprising the padding section from memory and append the padding section to the modified datablock for decoding and error correction.

* * * * *

UNITED STATES PATENT AND TRADEMARK OFFICE
CERTIFICATE OF CORRECTION

PATENT NO. : 12,298,844 B2  
APPLICATION NO. : 18/231557  
DATED : May 13, 2025  
INVENTOR(S) : Lawrence K Warman Page 1 of 1

It is certified that error appears in the above-identified patent and that said Letters Patent is hereby corrected as shown below:

In the Specification

In Column 6, Line 45, delete "b" and insert --$b_1$-- therefor

In Column 7, Line 43, delete "word."-a" and insert --"word,"-a-- therefor

In Column 9, Line 61, delete "row." and insert --row,-- therefor

In Column 10, Line 44, delete "by" and insert --$b_1$-- therefor

In Column 11, Line 14, delete "by" and insert --$b_1$-- therefor

In Column 14, Line 36, delete "circuit" and insert --circuitry-- therefor

In Column 14, Line 38, delete "ore" and insert --or-- therefor

In Column 15, Line 38, delete "500." and insert --506.-- therefor

Signed and Sealed this  
Twelfth Day of August, 2025

Coke Morgan Stewart  
*Acting Director of the United States Patent and Trademark Office*